May 30, 1961 H. A. MASHEDER 2,986,373
BUTTERFLY VALVES
Filed Jan. 13, 1958 3 Sheets-Sheet 1
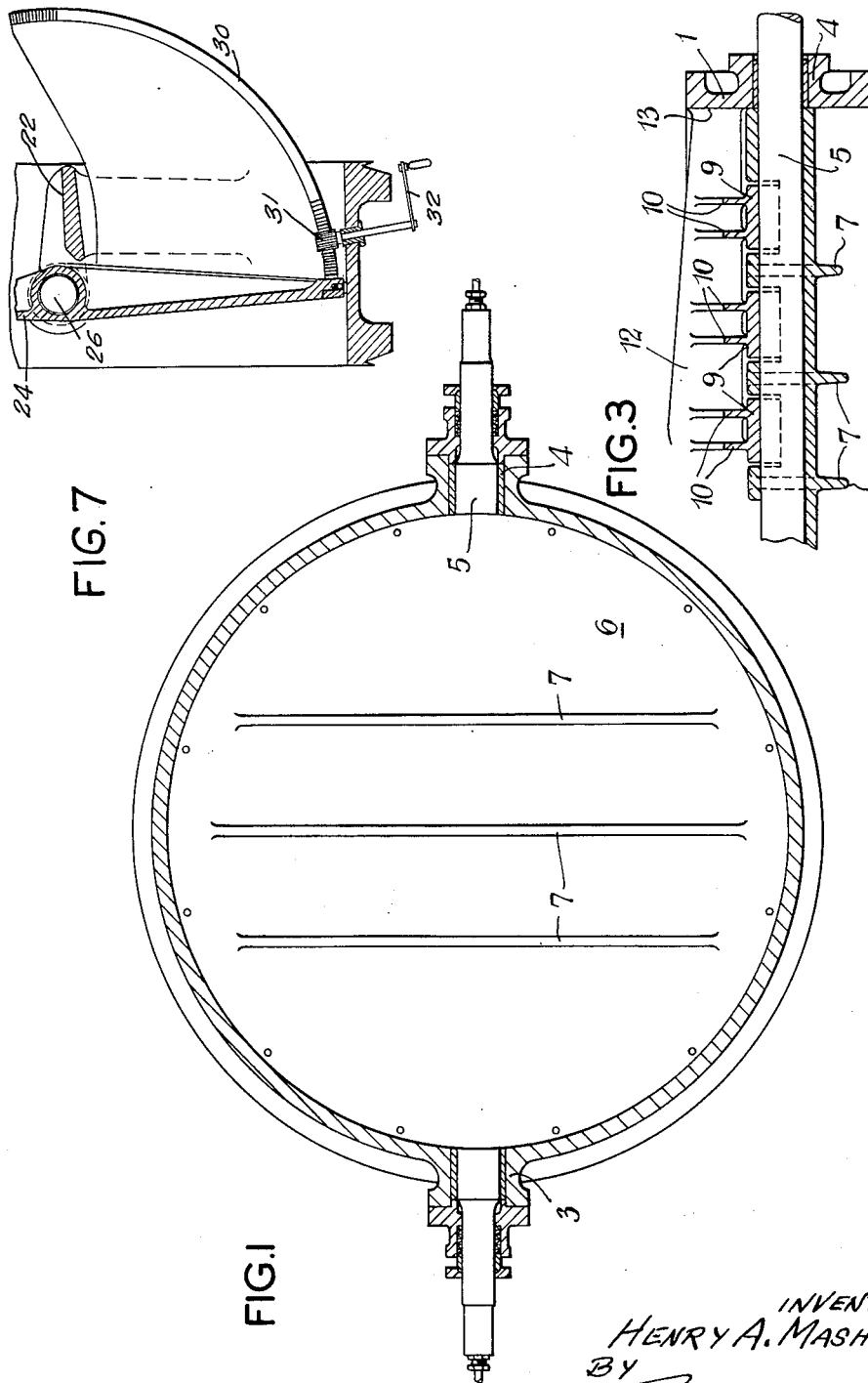
INVENTOR
HENRY A. MASHEDER
BY May 30, 1961 H. A. MASHEDER 2,986,373
BUTTERFLY VALVES
Filed Jan. 13, 1958 3 Sheets-Sheet 2
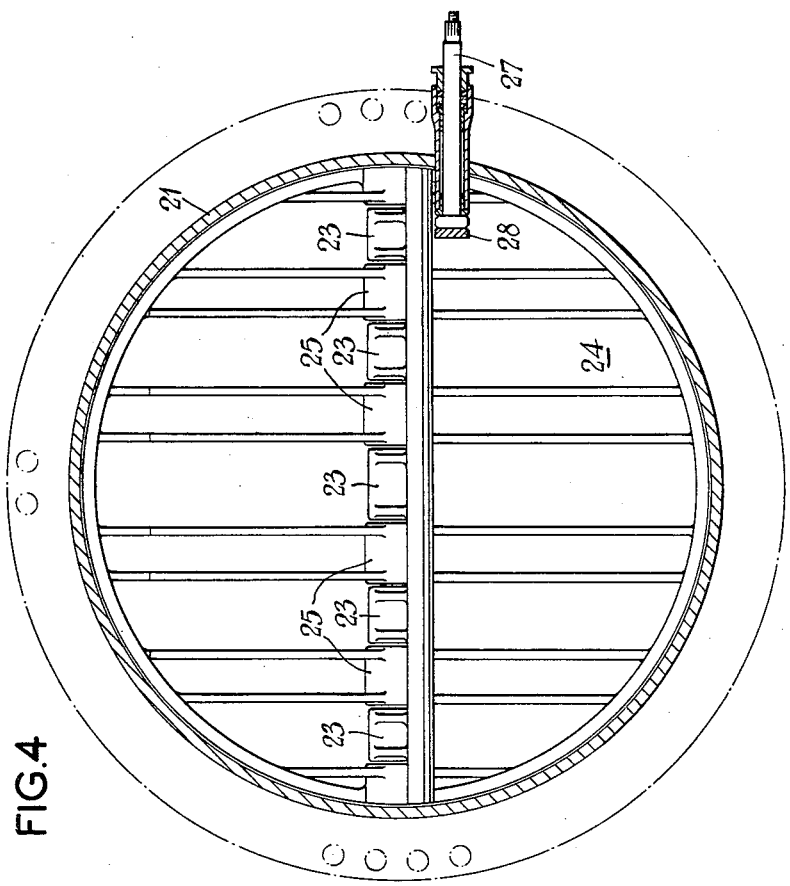
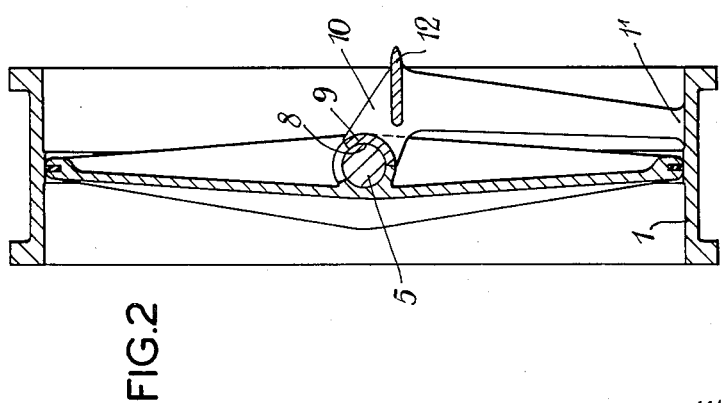
INVENTOR
HENRY A. MASHEDER
BY May 30, 1961   H. A. MASHEDER   2,986,373
BUTTERFLY VALVES Filed Jan. 13, 1958   3 Sheets-Sheet 3

INVENTOR
HENRY A. MASHEDER
BY

United States Patent Office 2,986,373
Patented May 30, 1961

2,986,373

BUTTERFLY VALVES

Henry Albert Masheder, Stanmore, England, assignor to James Gordon & Co. Limited, Stanmore, England Filed Jan. 13, 1958, Ser. No. 708,515

Claims priority, application Great Britain Jan. 16, 1957

8 Claims. (Cl. 251—248)

This invention concerns valves of large size such as are suitable for obturating gas flow thorugh large pipes.

There is an increasing requirement for such valves which must be capable of withstanding differential pressures of some hundreds of pounds per square inch and be easily and quickly operable.

Butterfly valves are attractive for fulfilling this requirement from the point of view of balanced operation but they are not ordinarily suitable for dealing with high pressures owing to the very high loading applied to the spindle and bearings.

It is the object of the invention to provide a butterfly valve of large size which is capable of withstanding high pressures.

The invention provides a butterfly valve in which the wings of the valve are carried on a spindle which is braced between its ends by at least one bearing carried on at least one member fixed within the valve body in a manner permitting the valve to be opened.

Preferably several bearings are used, spaced over the length of the spindle and carried on grid members reinforced by one or more bridge members lying parallel to the spindle.

The grid and bridge members are conveniently fixed within one half of the valve body on the down-stream side of the valve with the members at right angles to the spindle, but where complete rings are employed as bearings it is immaterial whether the grid is located upstream or downstream of the valve.

The grid and bridge members should be relatively narrow in cross-section so as to interfere as little as possible with full-bore flow when the valve is open. To this end, also, the individual bearings may each be supported by two or more narrow grid members rather than by a single thicker member.

In valves employing rings for bracing the spindle the valve has a series of rings formed on one face, whose centres lie on a line parallel with a diameter of the valve, the rings being intermittently spaced and intermeshed with a similar series of rings on a supporting grid or bridge fixed within the valve body in a manner permitting the valve to open and a spindle passed through the rings in the manner of the pin of a butt hinge.

The rings on the supporting grid or bridge may be formed integrally with it or may be separate units bolted or welded to it.

The spindle may be supported at its ends in bearings in the wall of the valve body or the spindle may be shorter in length than the diameter of the valve body and be carried entirely by the grid or bridge.

If a short spindle is used, an entire ring seat may be provided around the circumference of the valve with consequent possibility of improved sealing.

The above and other parts of the invention are embodied in preferred forms of valve developed for use with high pressures which will now be described in some detail by way of example with reference to the accompanying drawings in which:

Fig. 1 is an end view in part section of a valve employing bracing pads for the spindle, Fig. 2 is a central vertical section through the valve of Fig. 1, Fig. 3 is a central horizontal section through the right hand half of the valve of Fig. 1.

Fig. 4 is an end view in part section of a valve employing intermeshed rings for bracing the spindle, Fig. 7 is a vertical sectional view through another embodiment of the invention.

Figure 5:
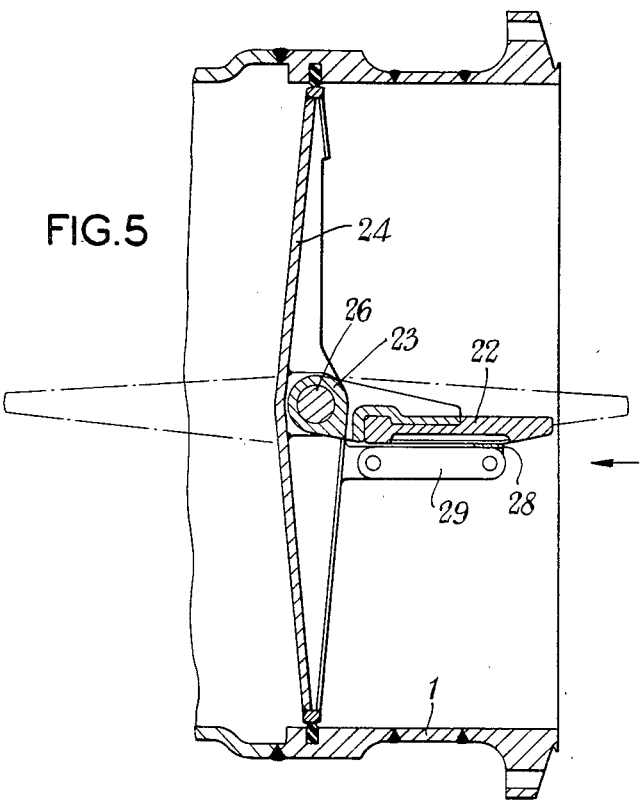
Fig. 5 is a central vertical section through the valve of Fig. 4.

Referring first to Figs. 1 to 3 the valve body is a cylindrical casing 1 some 5 feet in internal diameter providing bearing housings at 3 and 4 at opposite sides for the valve spindle 5.

The circular valve 6 is keyed to the spindle 5 and is strengthened by transverse ribs 7.

At intervals across its diameter the valve is formed with cut-away portions exposing arcuate sections 8 of the valve spindle 5 on its down-stream side (see Fig. 3).

The exposed sections of the spindle subtend an angle of something over 180° at the centre of the spindle; in this example, an angle of 235°, is exposed and extends from the bottom of the spindle to a point 45° beyond the top when the valve is closed.

The lower quadrant and an arc of a further 45° of the exposed sections are fitted against bearing pads 9.

These bearing pads are each carried on a pair of webs 10 of narrow cross-section which are fixed (as at 11, Fig. 2) to the inner wall of the valve body 1 at spaced intervals about its lower semi-circumference.

A bridge piece in the form of a narrow web 12 parallel to the spindle 5 interconnects all the pairs of webs 10 carrying the pads 9 and is itself fixed to the inner wall of the casing (as at 13, Fig. 3).

The complete structure permits the valve wings to be turned through 90° to the fully open position and adds enormously to the spindle strength without interfering unduly with the full bore flow through the valve body when the valve is open due to the narrow form of the webs of which it is constructed.

Figure 6:
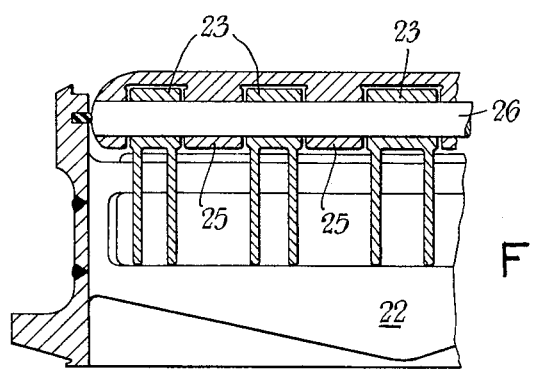
Fig. 6 is a central horizontal section through the left hand half of the valve of Fig. 4.

Referring now to Figs. 4 to 6, a cylindrical valve body 21 of several feet diameter has welded within the inner circumference of the body a horizontal bridge member 22 which carries a number (five in this example) of regularly spaced ribbed ring bosses 23 whose centres lie on the horizontal diameter of the body.

The valve itself is of more or less conventional form and comprises a circular ribbed plate 24 from one face of which extend a series of ring bosses 25 which are spaced along its horizontal diameter to intermesh with the ring bosses of the grid or bridge member.

The valve body 21 may be apertured on both ends of its horizontal diameter, so that a drill may be passed right through the intermeshed ring bosses of the bridge and the valve to form a perfectly circular hole through them.

A neatly fitting spindle is driven into position in the holes in the bosses, and if this spindle is shorter in length than the internal diameter of the valve body, it is then possible to plug the apertures in the body with well fitted plugs.

Alternatively the ring bosses 23 carried by the bridge are made as separate units as shown in Fig. 5. In this case the valve spindle 26 (which is shorter than the internal diameter of the casing 21) can be threaded through the ring bosses 23 and 25 before the valve 24 is fitted within the casing and the ring bosses 23 are welded or bolted to the bridge 22 to assemble the valve.

When a spindle shorter than the internal diameter of the valve casing is used, a spindle 27 carrying a cranked arm 28 and connected through a link 29 to the butterfly 24 is used to operate the valve.

Alternatively, as illustrated in Fig. 7, a rack 30 and pinion 31 may be employed to operate the valve by turning the hand crank 32 in the appropriate direction.

If a spindle of greater length than the diameter of the body is employed it may be keyed to the valve and one or both of its extremities (passing through an appropriate gland) may be used to operate the valve.

It will be clear that by suitably forming the strengthening ribs of the valve where they approach the bridge it is possible to arrange for full 90° movement of the valve without interference as shown in broken lines in Fig. 5.

Furthermore, it will be appreciated that the intermeshed rings of the bridge and valve, when spanned by the fitted spindle, enable the pressure load upon the valve to be distributed through the webs or fins of the bridge to the valve body regardless of which face of the valve that pressure load acts upon.

It will be understood that the invention is not restricted to the details of the specific embodiment described which may be varied without departing from the scope of the following claims.

I claim:

1. A butterfly valve capable of withstanding high pressure, comprising a large circular valve body having a bore therethrough, a bridge member fixed to the body at diametrically opposed positions within the body and spanning said bore and including a plurality of bearings disposed along the length thereof, a spindle journaled in said bearings, and a valve mounted on said spindle for movement angularly about the axis thereof and adapted to seat against the internal surface of said body defining the bore for controlling fluid flow through said bore, said bridge member being positioned out of the angular path of movement of said valve to permit the valve to be opened.

2. The valve of claim 1 wherein said bridge member is narrow in cross-section to minimize interference with flow through the valve body.

3. A butterfly valve according to claim 1 wherein several complete rings intermeshed with rings formed on a face of the valve and carried by the bridge member spanning the valve body are employed as said bearings.

4. A butterfly valve according to claim 1 wherein said spindle is shorter than the internal diameter of the valve body and mechanical means are provided for operating the valve.

5. A butterfly valve according to claim 4 wherein the mechanical means is comprised by a crank and link mechanism.

6. A butterfly valve according to claim 4 wherein the mechanical means is comprised by a rack and pinion.

7. A butterfly valve according to claim 1 wherein several pads carried on the bridge member fixed to the valve body downstream of the valve are employed as said bearings.

8. A butterfly valve according to claim 7 wherein the bridge member is disposed parallel to the valve spindle.

References Cited in the file of this patent

UNITED STATES PATENTS

| | | |
|---|---|---|
| 468,985 | Downs | Feb. 16, 1892 |
| 1,328,565 | Howard | Jan. 20, 1920 |
| 1,390,464 | Senstius | Sept. 13, 1921 |
| 1,441,317 | Walsh | Jan. 9, 1923 |
| 2,329,407 | Meyer | Sept. 14, 1943 |
| 2,586,927 | Fantz | Feb. 26, 1952 |
| 2,753,148 | Oetiker | July 3, 1956 |
| 2,873,942 | Drane | Feb. 17, 1959 |